(12) United States Patent
Matsushita

(10) Patent No.: US 7,193,340 B2
(45) Date of Patent: *Mar. 20, 2007

(54) LOW-PROFILE STEPPING MOTOR

(75) Inventor: Kunitake Matsushita, Shizuoka (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/504,452

(22) PCT Filed: Feb. 12, 2003

(86) PCT No.: PCT/JP03/01411

§ 371 (c)(1),
(2), (4) Date: May 5, 2005

(87) PCT Pub. No.: WO03/069766

PCT Pub. Date: Aug. 21, 2003

(65) Prior Publication Data

US 2005/0218730 A1 Oct. 6, 2005

(30) Foreign Application Priority Data

Feb. 14, 2002 (JP) ............................. 2002-036768

(51) Int. Cl.
*H02K 41/00* (2006.01)
(52) U.S. Cl. ..................... 310/49 R; 310/257
(58) Field of Classification Search ............. 310/49 R, 310/257, 217, 43
See application file for complete search history.

(56) References Cited

U.S. PATENT DOCUMENTS 3,256,453 A * 6/1966 Haydon ................. 310/156.26
5,703,419 A * 12/1997 Mizutani ................... 310/49 R
6,548,922 B1 * 4/2003 Takahashi et al. ........ 310/49 R
6,822,351 B2 * 11/2004 Matsushita et al. ....... 310/49 R
6,838,792 B2 * 1/2005 Matsushita et al. ....... 310/49 R
6,885,128 B2 * 4/2005 Matsushita et al. ......... 310/257

FOREIGN PATENT DOCUMENTS

| JP | 06-165467 | 6/1994 |
| JP | 10-095559 | 3/1998 |
| JP | 10-112970 | 4/1998 |
| JP | 01-136548 | 5/1998 |

* cited by examiner

*Primary Examiner*—Tran Nguyen
(74) *Attorney, Agent, or Firm*—McDermott Will & Emery LLP

(57) ABSTRACT

A low-profile stepping motor is disclosed, which is preferably used in downsized and lower-profiled electronic devices, such as a printer, a facsimile, a floppy disk drive, and the like. The motor comprises a stator assembly composed of first and second stator units (A, B), and a rotor assembly (50) rotatably disposes inside the stator assembly. The stator units (A, B) are shaped and structured identically with each other, and each structured such that upper and lower stator yokes (30/32, 31/33), which each have a plurality of pole teeth formed along one side, and which each have an exciting coil (40/42) disposed toward one side opposite to the one side having the pole teeth, are coupled to each other with their respective pole teeth intermeshing with each other with a shift of 180 degree electrical angle. The stator units (A, B) thus structured are joined to each other such that respective distal pole teeth adjacent to each other are shifted from each other by an electrical angle of either 90 or 270 degrees, and in this way the stator assembly is completed.

7 Claims, 6 Drawing Sheets

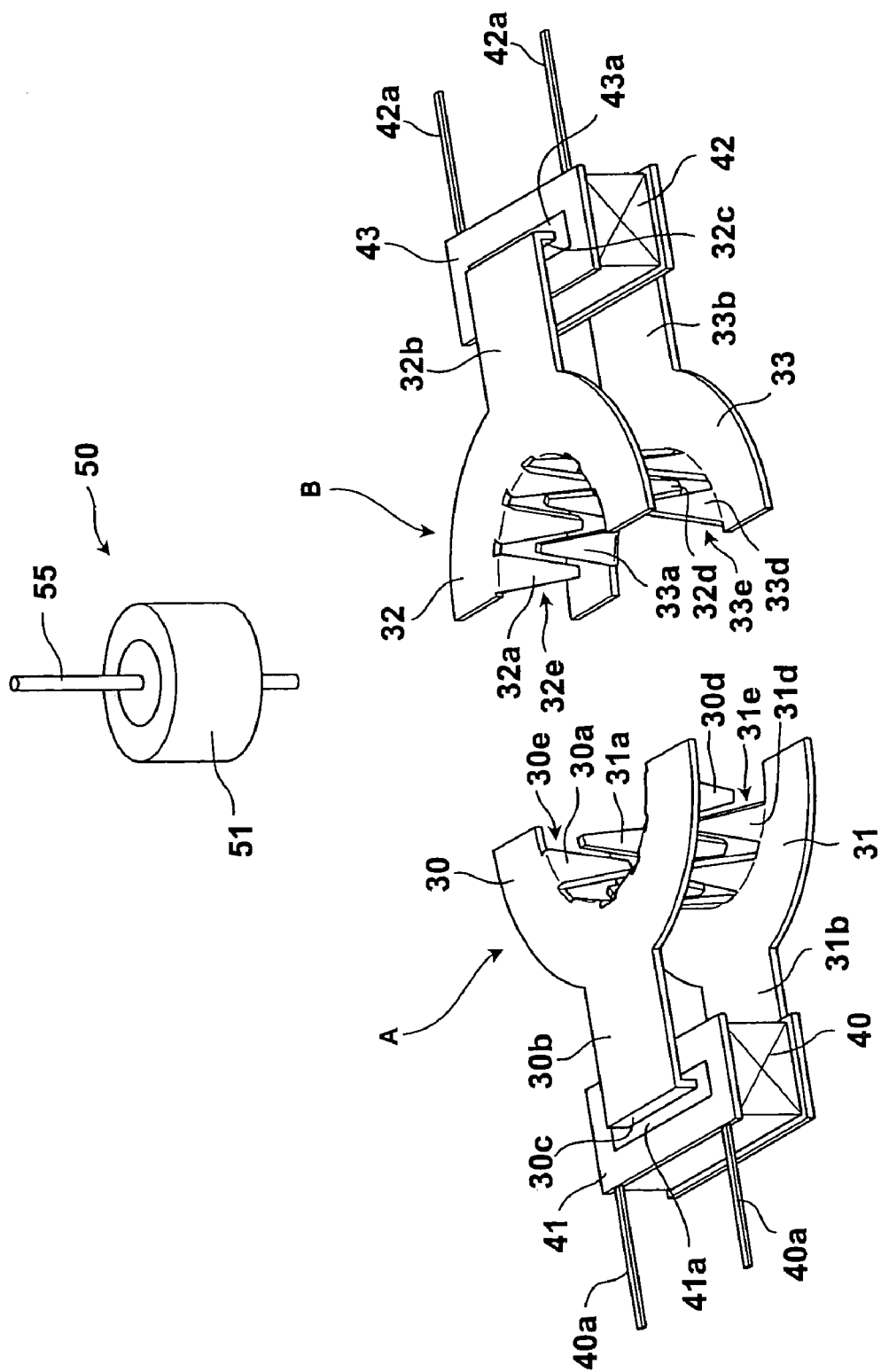

LOW-PROFILE STEPPING MOTOR

This application claims priority from PCT Application No. PCT/JP03/01411, filed Feb. 12, 2003 (incorporated by reference herein), and Japanese Application No. 2002-036768, filed Feb. 14, 2002 (incorporated by reference herein).

BACKGROUND OF THE INVENTION

1. Field of the Invention

The present invention relates to a stepping motor structure, and more specifically to a low-profile stepping motor having a reduced dimension in the axial direction.

2. Description of the Related Art

Recently, higher performance is increasingly required in various electronic devices such as a printer, a facsimile, and a floppy™ disk drive, and accordingly there is a growing requirement for a stepping motor provided both with a high performance such as a high torque and with a high quality such as a low cogging torque and a low vibration. PM (permanent magnet) type stepping motors, which satisfy the requirement to some extent, have been extensively used for the electronic devices.

FIGS. 1 to 5 explain a conventional PM type stepping motor extensively used, wherein FIG. 1 is a perspective view thereof partly cutaway, FIG. 2 is a cross-sectional (partly) view of one stator unit thereof, FIG. 3 is an exploded perspective view of a stator assembly thereof, FIG. 4 is an axial cross-sectional view thereof, and FIG. 5 is a developed view of an inner circumference (pole teeth) of a stator assembly thereof.

In FIG. 1, illustrated are: a front plate 1 punched out of a stainless steel plate; a front bearing 2 made of oil-impregnated alloy; stator yokes 3, 3' each punched out of a soft magnetic steel plate and formed into a doughnut shape with pole teeth 10 bent up at its inner circumference; coils 4, 4 each comprising a bobbin 5 with a polyurethane-coated copper wire wound therearound; two stator units 6, 6' each housing the coil 4 and coaxially attached to each other thus constituting a stator assembly 7; a rotary shaft 8 as a center of rotation; a field rotor magnet 9 facing the pole teeth 10 of the stator yokes 3, 3' and having a plurality of magnetic poles 11 (see FIG. 4) on its outer circumference; and a sleeve 12 jointing the rotor magnet 9 and the shaft 8 thus constituting a rotor assembly 22 (see FIG. 4).

Referring to FIG. 3, the stator units 6, 6' each comprise the stator yokes 3 and 3' whose respective pole teeth 10 are arranged so as to intermesh with each other with a constant gap therebetween as shown in FIG. 2 when the stator yokes 3 and 3' are coupled to each other, wherein the pole teeth 10 of the stator yoke 3 are shifted from the pole teeth 10 of the stator yoke 3' by an electrical angle of 180 degrees. The two stator units 6 and 6' constituting the stator assembly 7 are joined to each other coaxially by a molding method with a polymeric material, or by a plasma welding method such that respective intermeshing pole teeth 10 of the stator unit 6 and 6' are shifted from each other by an electrical angle of 90 degrees.

Referring to FIG. 4, the rotor assembly 22 is structured such that the shaft 8 as rotation center axis is press-fitted in the sleeve 12, which is inserted in the field rotor magnet 9 and adhesively fixed thereto so as to be concentric therewith. The rotor assembly 22 thus structured with the field rotor magnet 9 multi-pole magnetized is rotatably held inside the stator assembly 7 with the rotary shaft 8 inserted through the front bearing 2 and a rear bearing 16 both made of oil-impregnated alloy and fixed respectively to the front plate 1 and a rear plate 15, such that the field rotor magnet 9 with the plurality of magnetic poles 11 faces the inner circumference (defined by the pole teeth 10) of the stator assembly 7 with a small air gap in-between so as to be concentric with each other. The front and rear plates 1 and 15 are fixedly attached respectively to the stator 6 and 6' by, for example, plasma welding.

In FIG. 5, one example of the pole teeth 10 of the stator units 6 and 6' is shown as developed. In this example, the stator units 6, 6' each have ten pole teeth 10 in a space angle of 360 degrees, and the pole teeth 10 have a pitch interval identical with the width (not shown in the figure) of the magnetic poles 11 of the rotor magnet 9.

The aforementioned electronic devices are increasingly downsized and lower-profiled, and therefore the components incorporated in the devices, including a PM type stepping motor, are required to be downsized and lower-profiled. Especially, a PM type stepping motor is strongly requested to have its profile lowered even if it results in an increased horizontal area dimension. However, as known from FIGS. 1 and 4, the conventional PM stepping motor described above has two stator units 6, 6' stacked on each other in an axial direction, which puts limitations on decreasing the axial dimension, namely the profile.

SUMMARY OF THE INVENTION

The present invention has been made in view of the above circumstances and has as its object to provide a low-profile stepping motor further downsized in the axial direction.

In order to achieve the above object, according to the present invention, a stepping motor comprises: (a) a stator assembly composed of first and second stator units which are each structured such that upper and lower stator yokes, which each have a plurality of pole teeth formed along one side thereof and bent up toward each other, and which have an exciting coil arranged toward one side thereof opposite to the one side having the pole teeth, are coupled to each other with their respective pole teeth shifted from each other by an electrical angle of 180 degrees, and which have their respective forefronts connected to each other with spacers of a non-magnetic material interposed in-between such that respective distal pole teeth positioned closest to the spacers and adjacent to each other are shifted from each other by an electrical angle of either 90 or 270 degrees; and (b) a rotor assembly including a hollow-cylindrical magnet, and rotatably disposed centrally inside the stator assembly such that the magnet faces the pole teeth of the stator yokes with a small air gap in-between.

The stepping motor thus structured has its axial dimension (profile) reduced compared to a conventional stepping motor in which two stator units are coaxially stacked on each other, whereby a low-profile stepping motor is successfully achieved.

In the low-profile stepping motor, the upper and lower stator yokes are each shaped into a half-circular ring which has the plurality of pole teeth formed along an inner circumference thereof, and which has a magnetic path portion formed at an outer circumference thereof so as to protrude in a direction opposite to the pole teeth, the magnetic path having its distal end inserted in a hollow of a bobbin having the exciting coil therearound.

Also, in the low-profile motor, when the first and second stator units are fixedly joined to each other by injecting resin, the spacers interposed in-between may be eliminated and substituted by the resin injected, whereby the number of components can be reduced.

BRIEF DESCRIPTION OF THE DRAWINGS

FIG. 6 is an exploded perspective view of a relevant part of a low-profile stepping motor according to an embodiment of the present invention;

DETAILED DESCRIPTION OF THE PREFERRED EMBODIMENTS

Figure 1:
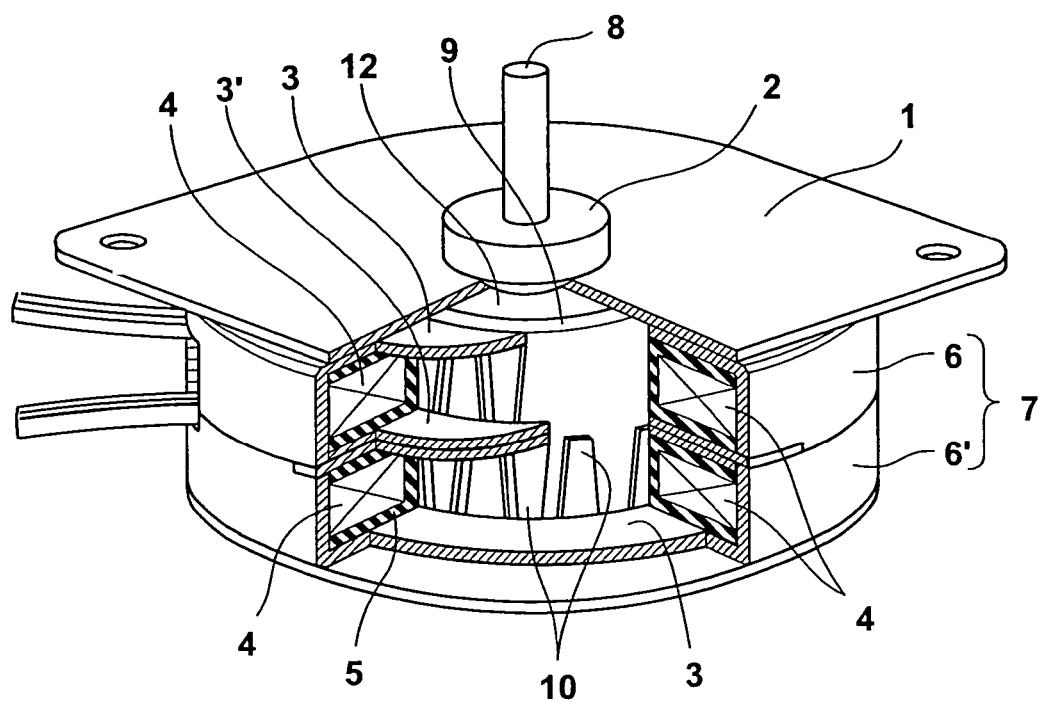
FIG. 1 is a partly cutaway perspective view of a conventional PM type stepping motor.
Figure 2:
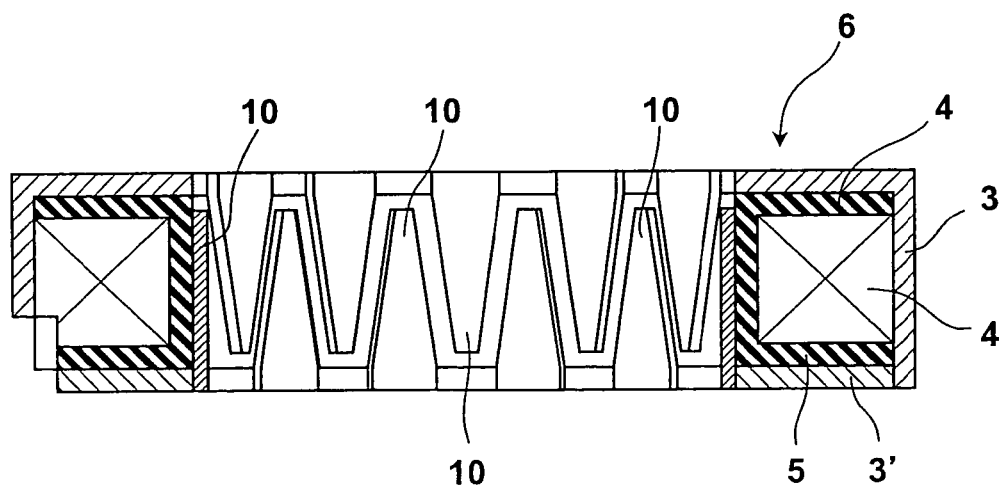
FIG. 2 is a cross-sectional (partly) view of one stator unit of the conventional PM type stepping motor shown in FIG. 1.
Figure 3:
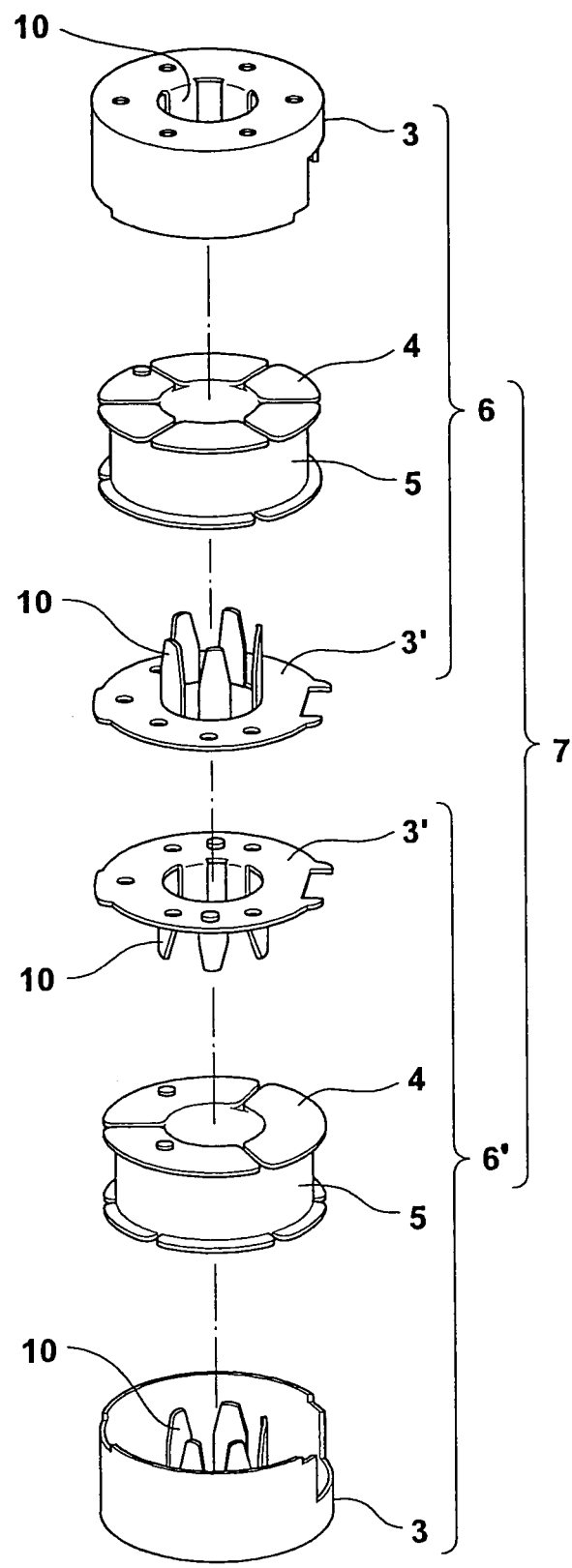
FIG. 3 is an exploded perspective view of a stator assembly of the conventional PM type stepping motor shown in FIG. 1.
Figure 4:
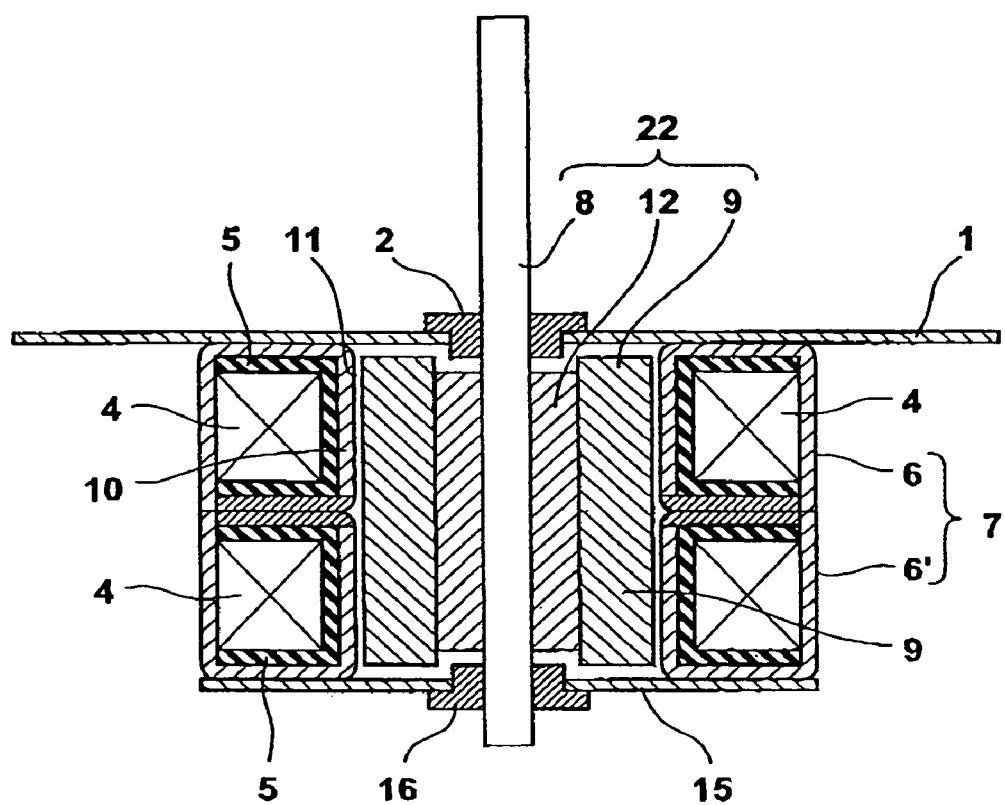
FIG. 4 is an axial cross-sectional view of the conventional PM type stepping motor shown in FIG. 1.

A preferred embodiment of the present invention will be described with reference to the accompanying drawings.

Referring to FIG. 6, a low-profile stepping motor of the present invention generally comprises: two stator units A, B which are two-dimensionally joined to each other to constitute a stator assembly having a structure substantially symmetric with respect to the joining line; and a rotor assembly 50 which will be described later. The stator unit A comprises upper and lower stator yokes 30 and 31 coupled to each other, and an exciting coil 40 wound around a bobbin 41, and the stator unit B comprises upper and lower stator yoke 32 and 33 coupled to each other, and an exciting coil 42 wound around a bobbin 43. The coils 40, 42 have respective connection terminals 40a, 42a.

Figure 7A:
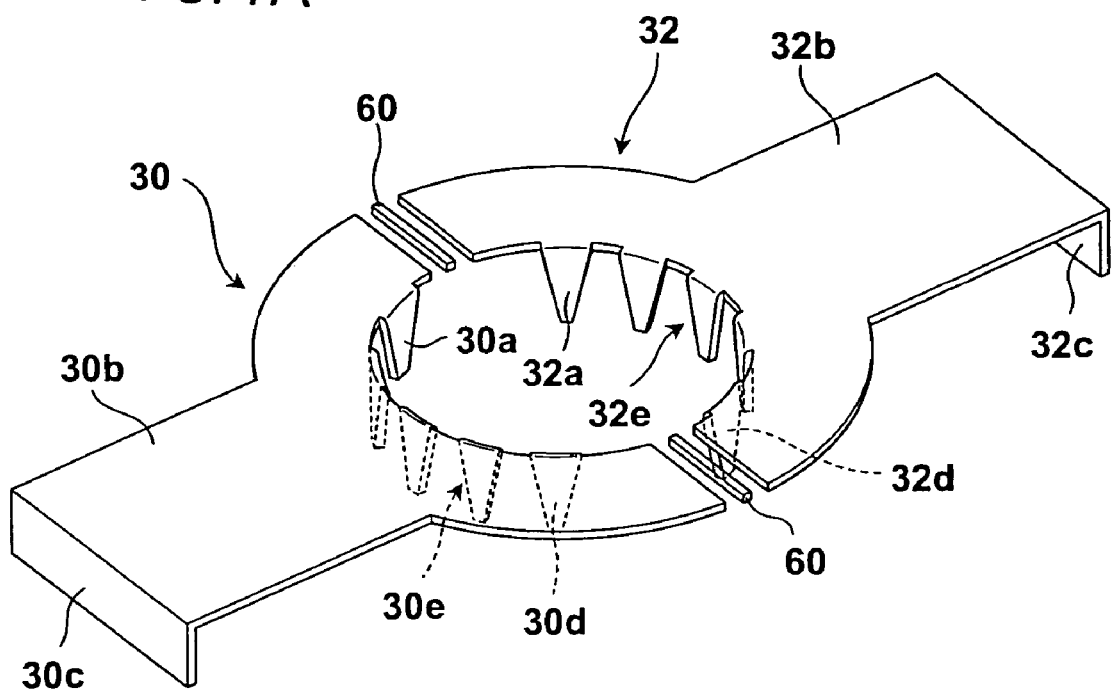
FIG. 7A is a perspective view of upper stator yokes of the low-profile stepping motor shown in FIG. 6.
Figure 7B:
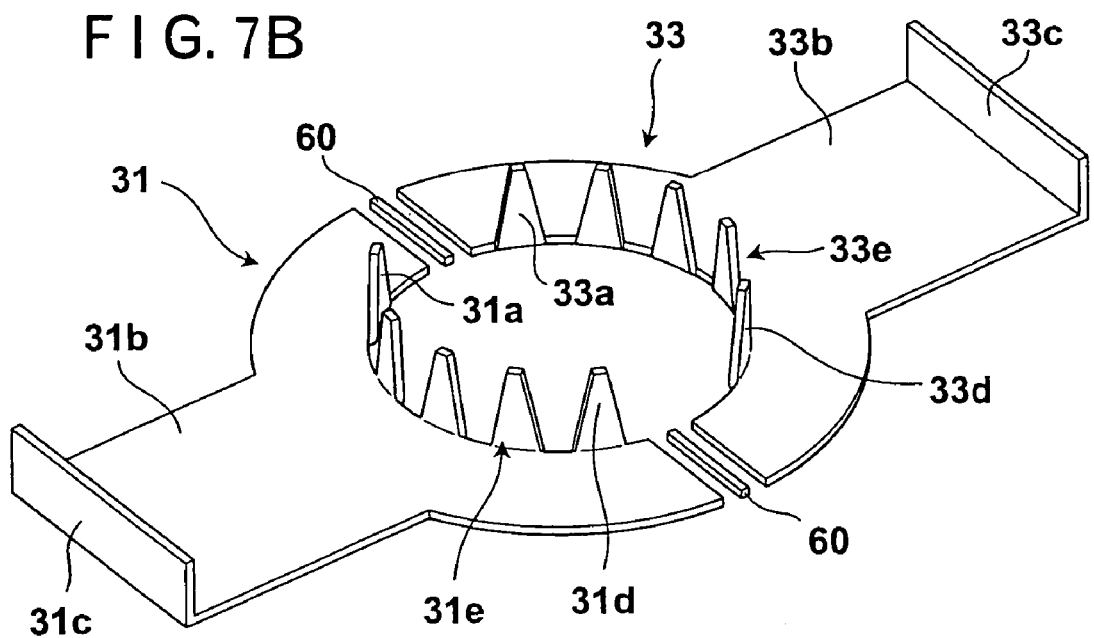
FIG. 7B is a perspective view of lower stator yokes thereof.

FIGS. 7A and 7B explain the low-profile stepping motor by focusing on its stator yokes, wherein FIG. 7A shows the upper stator yokes 30 and 32 arranged to oppose each other, and FIG. 7B shows the lower stator yokes 31 and 33 arranged to oppose each other. The stator yokes 30, 32, 31 and 33 are each punched out of a soft magnetic steel plate into a half-circular ring which has pole teeth arrayed along its inner circumference and bent up, and which has a magnetic path portion extending outward from the halfway portion of its outer circumference.

The upper and lower stator yokes 30, 31 of the stator unit A have respective pole tooth arrays 30e, 31e, and the upper and lower stator yokes 32, 33 of the stator unit B have respective pole tooth arrays 32e, 33e. The pole tooth array 30e is composed of a plurality of pole teeth 30a to 30d disposed at a regular interval along the inner circumference of the half-circular ring of the upper stator yoke 30, and the pole tooth arrays 31e, 32e and 33e are composed of respective pole teeth 31a to 31d, 32a to 32d, and 33a to 33d disposed in the same way as described above.

Referring to FIGS. 6, 7A and 7B, the stator yokes 30, 31, 32 and 33 have respective magnetic path portions 30b, 31b, 32b and 33b, which have their distal ends bent thus forming respective bending portions 30c, 31c, 32c and 33c. Each of the stator yokes 30, 31, 32 and 33 has its pole tooth array composed of pole teeth which are provided in a number appropriate to a required step number per revolution of the stepping motor and which are arrayed at a regular interval, and the pole teeth of the upper stator yokes 30 and 32 are shifted from the pole teeth of the lower stator yokes 31 and 33 by an electrical angle of 180 degrees.

Figure 5:
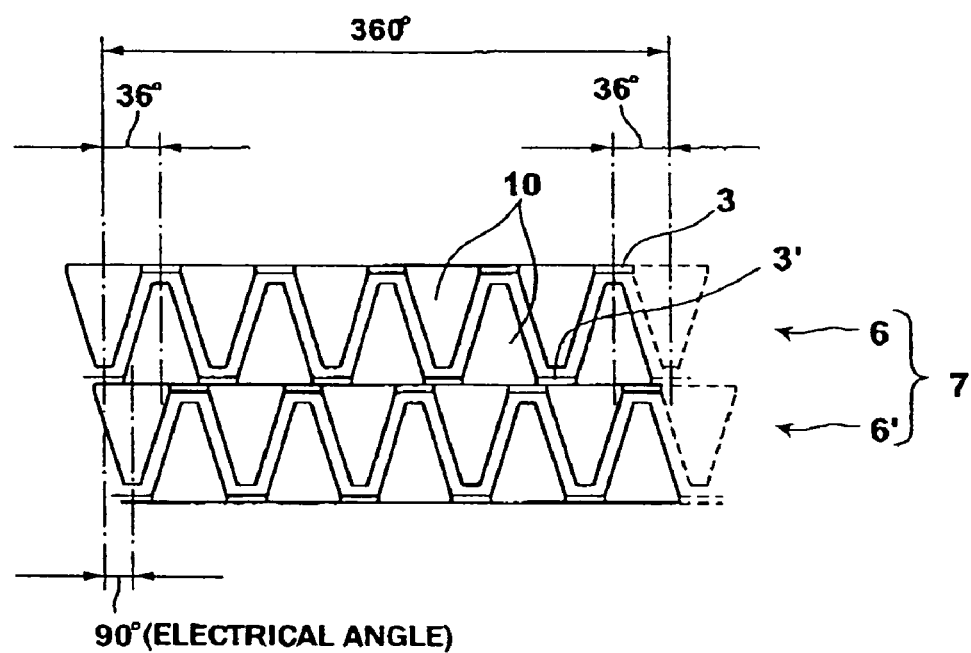
FIG. 5 is a developed view of an inner circumference (pole teeth) of a stator assembly of the conventional PM type stepping motor shown in FIG. 1.

The stepping motor of the present invention is essentially structured such that two upper stator yokes are coupled to two lower stator yokes, respectively, thereby constituting two stator units which are each shaped like a half-circular ring, each have a pole tooth array covering a space angle of 180 degrees out of the 360 degree space angle shown in FIG. 5, and which each form an independent magnetic circuit. And, pole teeth of the upper stator yokes intermesh with pole teeth of the lower stator yokes with a shift of 180 degree electrical angle.

Specifically, the stator unit A is structured such that the upper stator yoke 30 is coupled to the lower stator yoke 31 so as to forma a half-circular ring with their respective pole teeth shifted from each other by an electrical angle of 180 degrees, and that the bending portions 30c, 31c are inserted in a hollow 41a of the bobbin 41 having the exciting coil 40 therearound and have their respective ends connected to each other. In the same way, the stator unit B is structured such that the upper stator yoke 32 is coupled to the lower stator yoke 33 so as to form a half-circular ring with their respective pole teeth shifted from each other by an electrical angle of 180 degrees, and that the bending portions 32c, 33c are inserted in a hollow 43a of the bobbin 43 having the exciting coil 42 therearound and have their respective ends connected to each other.

The stator units A, B thus structured have their respective half-circular ring ends connected to each other via respective spacers 60 of a non-magnetic material interposed between the upper stator yokes 30 and 32 and between the lower stator yokes 31 and 34, such that their respective distal pole teeth positioned closest to the spacer 60 and adjacent to each other are shifted from each other by an electrical angle of either 90 or 270 degrees. Thus, a substantially annular stator assembly is formed. Specifically, in FIGS. 7A and 7B, the pole teeth 30a, 30d distally positioned of the upper stator yoke 30 are shifted respectively from the pole teeth 32a, 32d distally positioned of the upper stator yoke 32 by an electrical angle of either 90 or 270 degrees, and the pole teeth 31a, 31d distally positioned of the lower stator yoke 31 are shifted respectively from the pole teeth 33a, 33d distally positioned of the lower stator yoke 33 by an electrical angle of either 90 or 270 degrees. In this connection, stator yokes may be formed with a reduced number of pole teeth to achieve the above-described pole tooth arrangement shifted by an electrical angle of either 90 or 270 degrees.

The aforementioned rotor assembly 50, which has a rotary shaft 55 as its rotation axis, is rotatably held inside the stator assembly with a small air gap kept from the pole tooth arrays of the stator units A, B. The rotor assembly 50 is structured in the same way as conventionally, and has a hollow-cylindrical permanent magnet 51 constituting its outer circumference, which is provided with a plurality of magnetic poles arrayed at a regular interval.

Given that the rotor assembly 50 has its outer circumference multi-pole magnetized at a regular interval, and that the pole teeth of the stator units A, B are arrayed at a regular interval, since the stator units A, B form an annular stator assembly with their respective pole teeth shifted from each other by an electrical angle of 90 degrees, it may happen that the stator units A, B do not match each other in pole tooth number, which may cause it to happen that the stator units A, B are joined to each other at two portions such that their respective distal pole teeth adjacent to each other are shifted from each other by an electrical angle of 90 degrees at one portion while shifted by an electrical angle of 270 degrees at the other portion.

Figure 8:
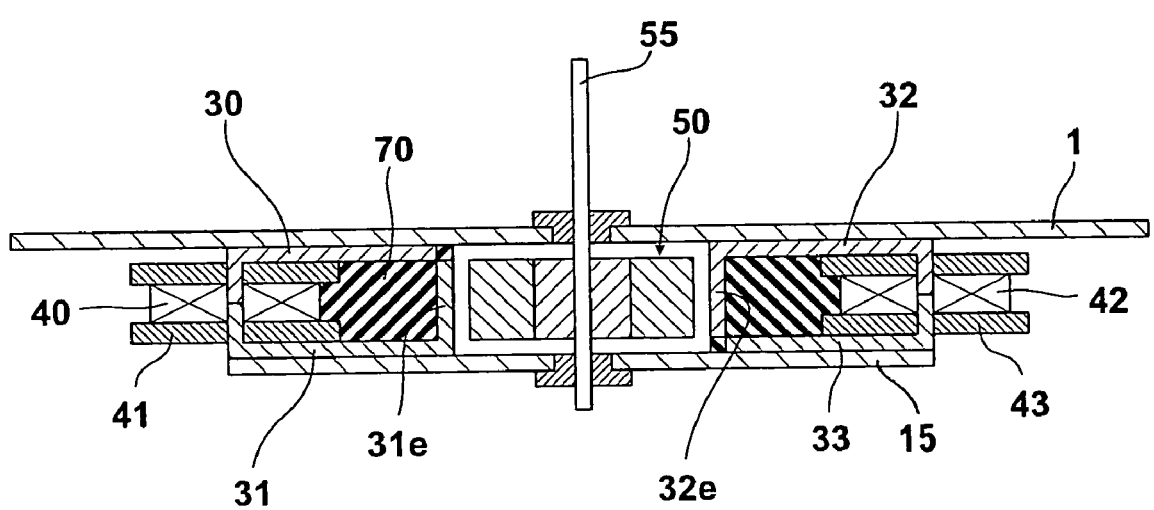
FIG. 8 is an axial cross-sectional view of the low-profile stepping motor shown in FIG. 6.

FIG. 8 is an axial cross-sectional view of the stepping motor thus structured. As seen in the figure, the stepping motor is of a low-profile structure having an axial dimension equal to about half of that of the conventional stepping motor.

In FIG. 8, a molding resin 70 is used to hold together the upper stator yoke 30/32 and the lower stator yoke 31/33, and the stator units A, B may also be fixedly put together by means of a molding resin. Specifically, the stator units A, B, which can be fixedly put together by welding via the front and rear plates 1 and 15 with the non-magnetic spacers 60 (refer to FIGS. 7A and 7B) interposed between the stator units A and B, may alternatively be fixedly resin-molded by injection molding together with the spacers 60 made of a non-magnetic material. In this connection, the spacers 60 may be eliminated and substituted by the resin injected, thereby reducing the number of components. Also, in this case, the resin may be filled in more extensively so as to cover the bobbins 41 and 43 with the exciting coils 40 and 42 for fixation to the stator yokes 30, 31 and 32, 33, which proves to be favorable with regard to vibration resistance. Polypropylene resin and polybutadiene resin are preferable in heat resistance.

INDUSTRIAL APPLICABILITY

The low-profile stepping motor of the present invention can be preferably incorporated in various electronic devices, such as a printer, a facsimile, a floppy (Trade Mark) disk drive, and the like, which are increasingly downsized with their profile lowered.

What is claimed is:

1. A low-profile stepping motor comprising:
    (a) a stator assembly comprising first and second stator units, wherein each of said first and second stator units is constructed such that upper and lower stator yokes are coupled to each other with their respective pole teeth shifted from each other by an electrical angle of 180 degrees, said upper and lower stator yoke each having a plurality of pole teeth formed along one side thereof and bent toward each other and an exciting coil arranged at the other side thereof opposite to said one side where the pole teeth are formed, the first and second stator units having their respective ends, the respective ends being connected to each other with spacers of a non-magnetic material interposed in-between such that their respective pole teeth positioned and adjacent to each other are shifted from each other by an electrical angle of either 90 or 270 degrees; and
    (b) a rotor assembly including a hollow-cylindrical magnet, and rotatably disposed centrally inside the stator assembly such that the magnet faces the pole teeth of the stator yokes with a small air gap in-between.

2. A low-profile stepping motor according to claim 1, wherein the upper and lower stator yokes are each shaped into a half-circular ring which has the plurality of pole teeth formed along an inner circumference thereof and which has a magnetic path portion formed at an outer circumference thereof so as to protrude in a direction opposite to the pole teeth, the magnetic path having its distal end inserted in a hollow of a bobbin having the exciting coil therearound.

3. A low-profile stepping motor according to claim 1, wherein the pole teeth are shaped trapezoidal.

4. A low-profile stepping motor according to claim 1, wherein the first and second stator units are fixedly joined to each other by injecting resin with the spacers interposed in-between.

5. A low-profile stepping motor according to claim 4, wherein the spacers are substituted by the resin injected for fixedly joining the first and second stator units to each other.

6. A low-profile stepping motor according to claim 4, wherein the bobbin having the exciting coil therearound is fixed to the stator yokes by means of the resin injected for fixedly coupling the first and second stator units to each other.

7. A low-profile stepping motor according to claim 1, wherein the first and second stator units are fixedly joined to each other by plasma welding with the spacers interposed in-between.

* * * * *